(12) United States Patent
Smith et al.

(10) Patent No.: US 10,528,765 B2
(45) Date of Patent: Jan. 7, 2020

(54) TECHNOLOGIES FOR SECURE BOOT PROVISIONING AND MANAGEMENT OF FIELD-PROGRAMMABLE GATE ARRAY IMAGES

(71) Applicant: Intel Corporation, Santa Clara, CA (US)

(72) Inventors: Ned M. Smith, Beaverton, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 15/267,322

(22) Filed: Sep. 16, 2016

(65) Prior Publication Data
US 2018/0082083 A1 Mar. 22, 2018

(51) Int. Cl.
G06F 21/44 (2013.01)
G06F 21/64 (2013.01)
G06F 9/4401 (2018.01)
G06F 21/57 (2013.01)

(52) U.S. Cl.
CPC ............ G06F 21/64 (2013.01); G06F 9/4403 (2013.01); G06F 9/4416 (2013.01); G06F 21/575 (2013.01)

(58) Field of Classification Search
None
See application file for complete search history.

(56) References Cited

U.S. PATENT DOCUMENTS

| | | | |
|---|---|---|---|
| 6,560,706 B1 * | 5/2003 | Carbajal | G06F 9/4416 713/155 |
| 7,069,452 B1 * | 6/2006 | Hind | G06F 21/572 713/1 |
| 7,822,958 B1 | 10/2010 | Allen et al. | |
| 9,230,112 B1 * | 1/2016 | Peterson | G06F 21/575 |
| 9,320,112 B2 * | 4/2016 | Tabor | H05B 37/0218 |
| 2006/0010326 A1 * | 1/2006 | Bade | G06F 21/572 713/176 |

(Continued)

OTHER PUBLICATIONS

WO 201104281. Nokia Corporation. (Year: 2011).*
International search report for PCT application No. PCT/US2017/047080, dated Nov. 14, 2017 (3 pages).

*Primary Examiner* — Venkat Perungavoor
(74) *Attorney, Agent, or Firm* — Barnes & Thornburg LLP

(57) ABSTRACT

Technologies for configuring a FPGA include a computing device having a processor and an FPGA. The computing device starts a secure boot process to establish a chain of trust that includes a trusted execution environment. The trusted execution environment loads an FPGA hash from an FPGA manifest stored in secure storage, and a platform trusted execution environment determines whether the FPGA hash is allowed for launch. To determine if the FPGA hash is allowed for launch, the platform trusted execution environment may evaluate one or more launch policies from the FPGA manifest. If allowed, the trusted execution environment configures the FPGA with an FPGA image corresponding to the FPGA hash and verifies the FPGA image with the FPGA hash. The platform trusted execution environment may receive the FPGA hash from a user via a trusted I/O session or from a remote management server. Other embodiments are described and claimed.

20 Claims, 3 Drawing Sheets

(56) References Cited

U.S. PATENT DOCUMENTS

| | | | |
|---|---|---|---|
| 2006/0075223 A1* | 4/2006 | Bade | G06F 21/57 |
| | | | 713/162 |
| 2007/0162964 A1* | 7/2007 | Wang | G06F 21/77 |
| | | | 726/5 |
| 2007/0288765 A1* | 12/2007 | Kean | G06F 21/76 |
| | | | 713/193 |
| 2008/0165952 A1* | 7/2008 | Smith | G06F 21/57 |
| | | | 380/28 |
| 2008/0168275 A1* | 7/2008 | De Atley | G06F 21/51 |
| | | | 713/189 |
| 2008/0244257 A1* | 10/2008 | Vaid | H04L 9/0827 |
| | | | 713/2 |
| 2009/0070598 A1* | 3/2009 | Cromer | G06F 21/575 |
| | | | 713/193 |
| 2010/0268967 A1* | 10/2010 | Senda | G06F 21/575 |
| | | | 713/193 |
| 2012/0102313 A1* | 4/2012 | Nicolson | G06F 21/575 |
| | | | 713/2 |
| 2013/0332745 A1 | 12/2013 | Woodall | |
| 2014/0248853 A1* | 9/2014 | Shipley | H04W 12/06 |
| | | | 455/411 |
| 2014/0331279 A1* | 11/2014 | Aissi | G06F 21/53 |
| | | | 726/1 |
| 2015/0012737 A1* | 1/2015 | Newell | G06F 21/575 |
| | | | 713/2 |
| 2015/0199520 A1* | 7/2015 | Woolley | G06F 21/575 |
| | | | 713/2 |
| 2015/0365436 A1* | 12/2015 | Shenefiel | H04L 63/20 |
| | | | 726/1 |
| 2016/0026826 A1 | 1/2016 | Kocher et al. | |
| 2016/0125187 A1* | 5/2016 | Oxford | G06F 21/575 |
| | | | 713/2 |
| 2016/0156469 A1 | 6/2016 | Takahashi | |

* cited by examiner

TECHNOLOGIES FOR SECURE BOOT PROVISIONING AND MANAGEMENT OF FIELD-PROGRAMMABLE GATE ARRAY IMAGES

BACKGROUND

Trusted and secure boot systems allow computing devices to verify software and firmware modules as they are loaded, establishing a chain of trust for the computing device. For example, a typical secure boot system may verify boot firmware, firmware drivers, an operating system loader, and an operating system of the computing device as they are loaded. The root of trust for secure boot may include, for example, a trusted platform module or other secure storage that includes one or more keys used to verify the platform firmware.

Certain computing devices may include one or more field programmable gate arrays (FPGAs). FPGAs are computer processing circuits that include configurable logical blocks, data interconnects, and other programmable digital logic resources. Thus, an FPGA may be configured to perform various tasks typically performed by an application-specific integrated circuit (ASIC) or other fixed hardware resource. An FPGA may be configured by installing an FPGA image, which may include a hardware definition such as a bitstream, a hardware definition language program (e.g., a VHDL program), or other hardware definition.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
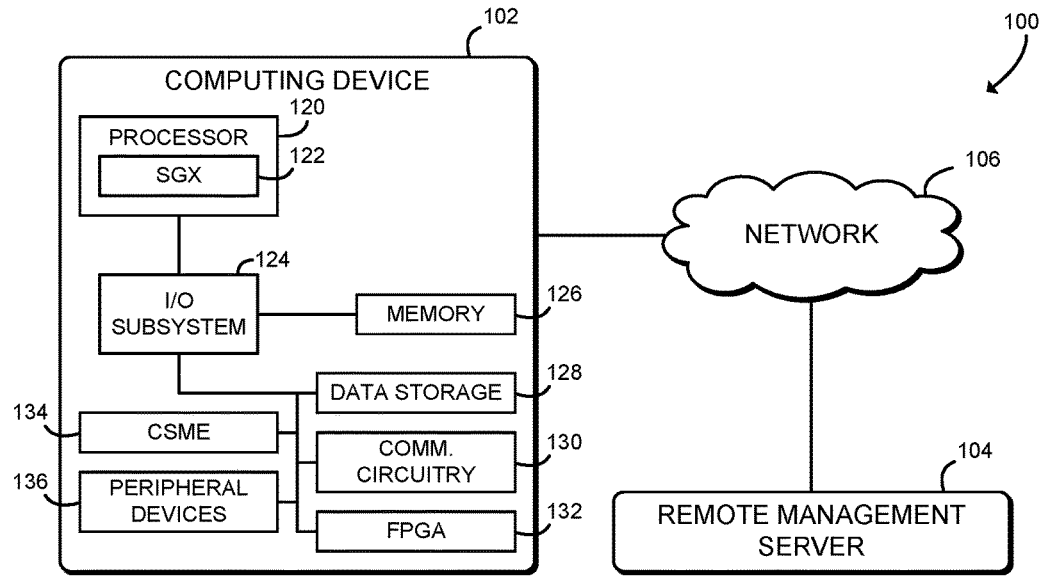
FIG. 1 is a simplified block diagram of at least one embodiment of a system for configuration and management of FPGA images.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for configuration and management of FPGA images includes a computing device 102 with a processor 120 and an FPGA 132. The system 100 may also include a remote management server 104 in communication with the computing device 102 via a network 106. In use, as described further below, the computing device 102 performs a secure boot process that includes verifying by a trusted execution environment. The trusted execution environment loads an FPGA hash from an FPGA manifest and a platform trusted execution environment determines whether the FPGA hash is allowed for use, for example by evaluating one or more launch configuration policies. If allowed, the trusted execution environment configures the FPGA 132 with an FPGA image corresponding to the FPGA hash, and verifies the FPGA image using the FPGA hash. The FPGA hash may be received by the platform trusted execution environment from the user via a trusted I/O session or from the remote management server 104. Additionally, although illustrated as including a single computing device 102 and remote management server 104, it should be understood that in some embodiments the system 100 may include any number of computing devices 102 and/or remote management servers 104. Thus, the system 100 allows for FPGA images to be incorporated into the secure boot process of the computing device 102. Additionally, the system 100 also may allow policy-based selection of FPGA images, for example allowing different FPGA images to be used for different device contexts.

The computing device 102 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively includes a processor 120, an input/output subsystem 124, a memory 126, a data storage device 128, and a communication subsystem 130. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 102 such as operating systems, applications, programs, libraries, and drivers. Additionally, part of the memory 126 may be used as an enclave page cache (EPC) to store encrypted code and/or data for the secure enclaves established by the processor 120. The processor 120 may encrypt memory pages of each secure enclave before transferring the encrypted pages out of the processor 120 to the EPC within the memory 126.

The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, the FPGA 132, and other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store one or more executable binary images, firmware images, and/or FPGA images.

The communication subsystem 130 of the computing device 102 may be embodied as any communication circuit, device, or collection thereof, capable of enabling communications between the computing device 102 and other remote devices over a network. The communication subsystem 130 may be configured to use any one or more communication technology (e.g., wired or wireless communications) and associated protocols (e.g., Ethernet, Bluetooth®, Wi-Fi®, WiMAX, etc.) to effect such communication.

As described above, the computing device 102 includes an FPGA 132. The FPGA 132 may be embodied as an integrated circuit including programmable digital logic resources that may be configured after manufacture, for example by a system integrator or an end user. The FPGA 132 may include, for example, a configurable array of logic blocks in communication over a configurable data interchange. The FPGA 132 may access data stored in the memory 126, for example using a local buffer of the FPGA 132. Additionally or alternatively, in some embodiments the FPGA 132 may also include dedicated, secure non-volatile memory (e.g., flash memory) that may be used as secure storage. Although illustrated in FIG. 1 as a discrete component separate from the processor 120 and/or the I/O subsystem 124, it should be understood that in some embodiments one or more of the FPGA 132, the processor 120, the I/O subsystem 124, and/or the memory 126 may be incorporated in the same package and/or in the same computer chip, for example in the same system-on-a-chip (SoC).

As shown, the computing device 102 may also include a converged security and manageability engine (CSME) 134 and one or more peripheral devices 136. The CSME 134 may be embodied as any hardware component(s) or circuitry capable of providing manageability and security-related services to the computing device 102. In particular, the CSME 134 may include a microprocessor, microcontroller, or other embedded controller capable of executing firmware and/or other code independently and securely from the processor 120. Thus, the CSME 134 may be used to establish a trusted execution environment for the computing device 102. The CSME 134 may communicate with the processor 120 and/or other components of the computing device 102 over a dedicated bus, such as a host embedded controller interface (HECI). The CSME 134 may also provide remote configuration, control, or management of the computing device 102. Further, in some embodiments, the CSME 134 is also capable of communicating using the communication subsystem 130 or a dedicated communication circuit independently of the state of the computing device 102 (e.g., independently of the state of the main processor 120), also known as "out-of-band" communication. Illustratively, the CSME 134 is incorporated in a system-on-a-chip (SoC) of the computing device 102; however, in some embodiments, the computing device 102 may include one or more additional components capable of establishing a trusted execution environment, such as a security engine, an out-of-band processor, a Trusted Platform Module (TPM), and/or another security engine device or collection of devices.

The peripheral devices 136 may include any number of additional input/output devices, interface devices, and/or other peripheral devices. For example, in some embodiments, the peripheral devices 136 may include a display, touch screen, graphics circuitry, keyboard, mouse, speaker system, microphone, network interface, and/or other input/output devices, interface devices, and/or peripheral devices.

The remote management server 104 may be embodied as any type of computation or computer device capable of performing the functions described herein, including, without limitation, a computer, a multiprocessor system, a server, a rack-mounted server, a blade server, a network appliance, a distributed computing system, a processor-based system, and/or a consumer electronic device. As such, the remote management server 104 may be embodied as a single server computing device or a collection of servers and associated devices. For example, in some embodiments, the remote management server 104 may be embodied as a "virtual server" formed from multiple computing devices distributed across the network 106 and operating in a public or private cloud. Accordingly, although the remote management server 104 is illustrated in FIG. 1 and described below as embodied as a single server computing device, it should be appreciated that the remote management server 104 may be embodied as multiple devices cooperating together to facilitate the functionality described below. The remote management server 104 may include a processor, an I/O subsystem, a memory, a data storage device, a communication subsystem, and/or other components and devices commonly found in a server or similar computing device. Those individual components of the remote management server 104 may be similar to the corresponding components of the computing device 102, the description of which is applicable to the corresponding components of the remote management server 104 and is not repeated herein so as not to obscure the present disclosure.

As discussed in more detail below, the computing device 102 and the remote management server 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet or RF network. As such, the network 106 may include any number of additional devices, such as additional computers, routers, and switches, to facilitate communications among the devices of the system 100.

Figure 2:
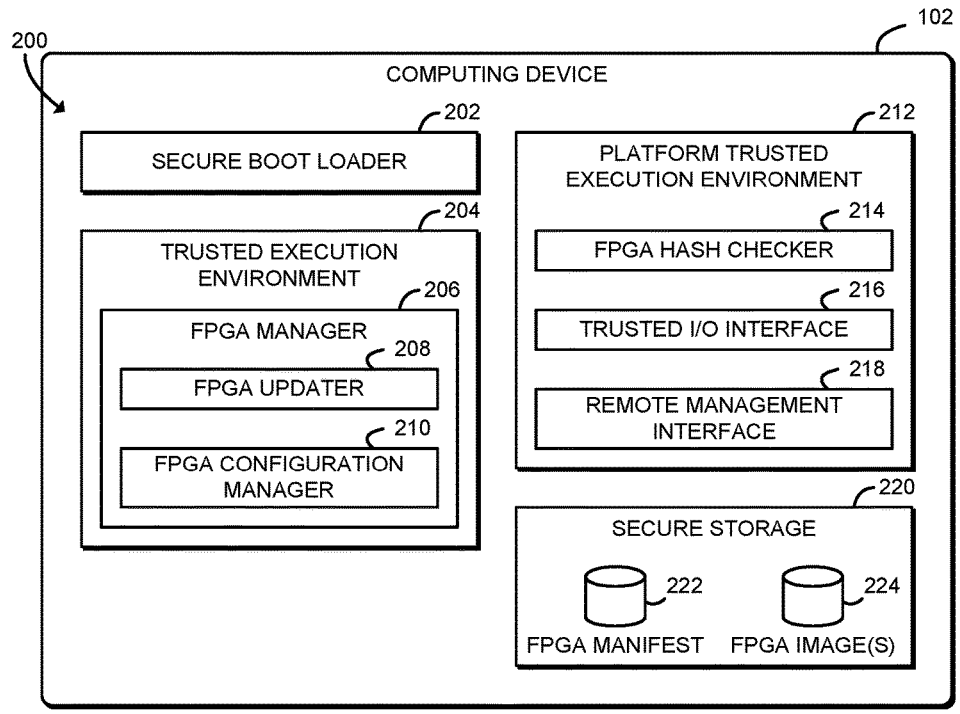
FIG. 2 is a simplified block diagram of at least one embodiment of an environment that may be established by a computing device of FIG. 1.

Referring now to FIG. 2, in an illustrative embodiment, the computing device 102 establishes an environment 200 during operation. The illustrative environment 200 includes a secure boot loader 202, a trusted execution environment 204, a platform trusted execution environment 212, and secure storage 220. The trusted execution environment 204 includes an FPGA manager 206, and the platform trusted execution environment 212 includes an FPGA hash checker 214, a trusted I/O interface 216, and a remote management interface 218. The various components of the environment 200 may be embodied as hardware, firmware, software, or a combination thereof. As such, in some embodiments, one or more of the components of the environment 200 may be embodied as circuitry or collection of electrical devices (e.g., secure boot loader circuitry 202, FPGA manager circuitry 206, FPGA hash checker circuitry 214, trusted I/O interface circuitry 216, and/or remote management interface circuitry 218). It should be appreciated that, in such embodiments, one or more of the secure boot loader circuitry 202, the FPGA manager circuitry 206, the FPGA hash checker circuitry 214, the trusted I/O interface circuitry 216, and/or the remote management interface circuitry 218 may form a portion of one or more of the processor 120, the I/O subsystem 124, the FPGA 132, the CSME 134, and/or other components of the computing device 102. Additionally, in some embodiments, one or more of the illustrative components may form a portion of another component and/or one or more of the illustrative components may be independent of one another.

The secure boot loader 202 is configured to start a secure boot process to establish a chain of trust. The chain of trust includes the trusted execution environment 204 of the computing device 102. As described further below, the secure boot process may be embodied as Intel® Trusted Execution Technology (TXT) or other secure boot technology.

The trusted execution environment 204 may be embodied as any isolated and secure execution environment within the environment 200. Code and/or data accessed by the trusted execution environment 204 may be validated and protected from unauthorized access and/or modification. Additionally, the trusted execution environment 204 has access to the secure storage 220. In the illustrative embodiment, the trusted execution environment 204 may be provided by the FPGA 132 or the CSME 134, which each may provide a secure execution environment that is independent from the processor 120 of the computing device 102. Additionally or alternatively, in other embodiments the trusted execution environment 204 may be provided with a secure enclave or other secure software environment such as an Intel SGX secure enclave, an AMD® TrustZone® secure world, or other secure environment. As shown, the trusted execution environment 204 includes the FPGA manager 206.

The FPGA manager 206 is configured to load, by the trusted execution environment 204, an FPGA hash from an FPGA manifest 222 stored in the secure storage 220 of the computing device 102 in response to starting the secure boot process. The FPGA hash may include a hash of an FPGA image 224. The FPGA image 224 may include a bitstream, VHDL program, or any other module definition for the FPGA 132. For example, the FPGA image 224 may allow the FPGA 132 to perform the functions of a bus controller, an I/O controller, an embedded controller, or other functions typically performed by an ASIC, microcontroller, or other hardware component of the computing device 102.

The FPGA manager 206 is further configured to configure, by the trusted execution environment 204, the FPGA 132 with the FPGA image 224 that corresponds to the FPGA hash in response to the FPGA hash checker 214 determining that the FPGA hash is allowed for launch, as described further below. The FPGA manager 206 is further configured to verify, by the trusted execution environment 204, the FPGA image 224 of the FPGA 132 using the FPGA hash in response to configuring the FPGA 132.

The FPGA manager 206 may be further configured to store, by the trusted execution environment 204, the FPGA hash in the FPGA manifest 222 in the secure storage 220, to set, by the trusted execution environment 204, an FPGA launch bit in response to storing the FPGA hash, and to reset the computing device 102 in response to setting the FPGA launch bit. The FPGA manager 206 may be further configured to determine, by the trusted execution environment 204, whether the FPGA launch bit is set in response to starting the secure boot process and to load the FPGA hash in response to determining that the FPGA launch bit is set.

In some embodiments, the FPGA manager 206 may be configured to seal, by the trusted execution environment 204, the FPGA hash to generate an encrypted hash bound to a trusted execution environment 204 boot code in response to storing the FPGA hash in the FPGA manifest 222. The FPGA manager 206 may be further configured to unseal, by the trusted execution environment 204 boot code, the encrypted hash to recover the FPGA hash.

The FPGA manager 206 may be further configured to update, by the trusted execution environment 204, the FPGA manifest 222 with a launch policy associated with the FPGA hash in response to storing the FPGA hash in the FPGA hash manifest. The FPGA manager 206 may be further configured to provision, by the trusted execution environment 204, the FPGA image 224 to the secure storage 220. Configuring the FPGA 132 may include loading the FPGA image 224 from the secure storage 220. The FPGA image 224 may be received by the trusted execution environment 204 from a remote computing device. In some embodiments, the functions of the FPGA manager 206 may be performed by one or more sub-components, such as an FPGA updater 208 or an FPGA configuration manager 210.

Similar to the trusted execution environment 204, the platform trusted execution environment 212 may also be embodied as any isolated and secure execution environment within the environment 200. Code and/or data accessed by the platform trusted execution environment 212 may be validated and protected from unauthorized access and/or modification. Additionally, the platform trusted execution environment 212 may have access to the secure storage 220. In the illustrative embodiment, the trusted execution environment 204 may be provided by the CSME 134, which provides a secure execution environment that is independent from the processor 120 of the computing device 102. Additionally or alternatively, in other embodiments the platform trusted execution environment 212 may be provided with a secure enclave or other secure software environment such as an Intel SGX secure enclave, an AMD® TrustZone® secure world, or other secure environment. In some embodiments, the platform trusted execution environment 212 and the trusted execution environment 204 may be established by the same component (e.g., the CSME 134). As shown, the platform trusted execution environment 212 includes the FPGA hash checker 214, the trusted I/O interface 216, and the remote management interface 218.

The FPGA hash checker 214 is configured to determine, by the platform trusted execution environment 212, whether the FPGA hash is allowed for launch in response to loading the FPGA hash from the FPGA manifest 222. Determining whether the FPGA hash is allowed for launch may include evaluating a launch policy from the FPGA manifest 222 that is associated with the FPGA hash. The FPGA hash checker 214 may be further configured to select, by the platform trusted execution environment 212, the FPGA hash from the FPGA manifest 222 based on the associated launch policy. The FPGA manifest 222 may store multiple FPGA hashes. The FPGA hash checker 214 may be further configured to perform, by the platform trusted execution environment 212, one or more policy-based actions in response to determining that the FPGA hash is not allowed for launch.

The trusted I/O interface 216 is configured to open, by the platform trusted execution environment 212, a trusted I/O session and to receive, by the platform trusted execution environment 212, the FPGA hash via the trusted I/O session. The platform trusted execution environment 212 may start the trusted I/O session in response to receiving a request from the FPGA manager 206. The remote management interface 218 is configured to receive, by the platform trusted execution environment 212, the FPGA hash from the remote management server 104 via an out-of-band network connection.

Figure 3:
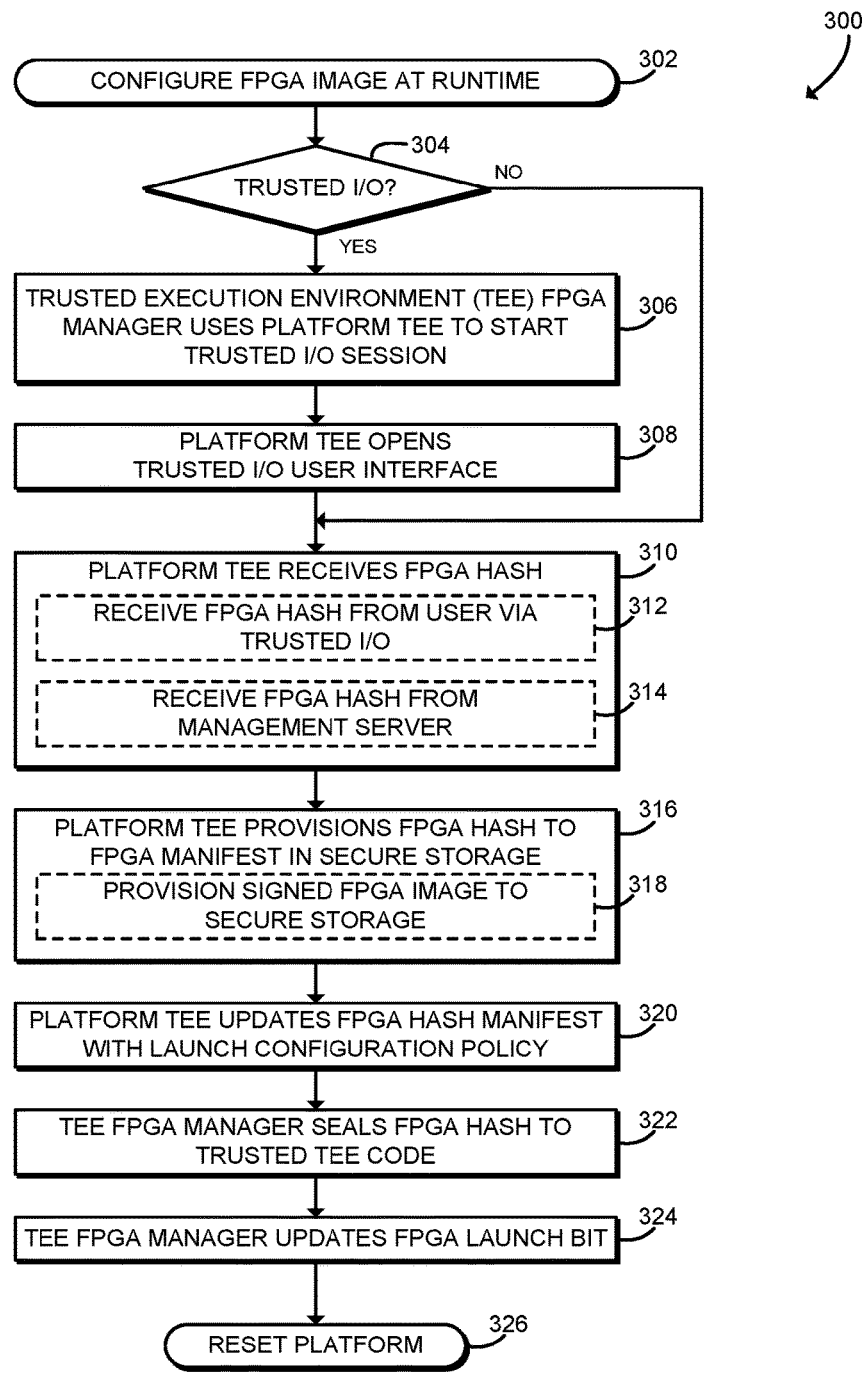
FIG. 3 is a simplified flow diagram of at least one embodiment of a method for runtime configuration of an FPGA image that may be executed by the computing device of FIGS. 1-2.

Referring now to FIG. 3, in use, the computing device 102 may execute a method 300 for FPGA image configuration at runtime. It should be appreciated that, in some embodiments, the operations of the method 300 may be performed by one or more modules of the environment 200 of the computing device 102 as shown in FIG. 2. The method 300 begins in block 302, in which the computing device 102 starts configuration of the FPGA image 224 at runtime. The method 300 may be executed, for example, in response to a user command, in response to manageability commands received from the remote management server 104, or in response to another management event. In some embodiments, the computing device 102 may verify that the computing device 102 supports managing the FPGA image 224, for example by verifying that the FPGA launch bit is supported, as described further below.

In block 304, the computing device 102 determines whether to use trusted I/O to receive the FPGA hash. The computing device 102 may use any appropriate criteria to determine whether to use trusted I/O. For example, the computing device 102 may determine whether to use trusted I/O based on configuration settings, based on whether the platform trusted execution environment 212 supports trusted I/O, based on whether configuration of the FPGA image 224 was initiated remotely, or any other criteria. If the computing device 102 determines not to use trusted I/O, the method 300 skips ahead to block 310, described below. If the computing device 102 determines to use trusted I/O, the method 300 advances to block 306.

In block 306, the FPGA manager 206 of the trusted execution environment 204 requests the platform trusted execution environment 212 to start a trusted I/O session. The FPGA manager 206 may use any technique to request the trusted I/O session. For example, the FPGA manager 206 may send a request to the CSME 134 via the HECI bus, as a network request, or using any other appropriate technique. In block 308, the platform trusted execution environment 212 opens a trusted I/O user interface. The platform trusted execution environment 212 may use any trusted I/O technique to open the trusted I/O session. For example, the platform trusted execution environment 212 may receive user input from one or more dedicated input devices (e.g., a dedicated PIN pad, keyboard, or other input device), or the platform trusted execution environment 212 may receive user input from one or more peripheral devices 136 via a secure communication path. In some embodiments, the platform trusted execution environment 212 may display a secure graphical user interface, for example using a protected audio/video path (PAVP) or other protected graphical output technique. Thus, by using trusted I/O provided by the platform trusted execution environment 212, the FPGA manager 206 is capable of requesting a secure graphical user interface at runtime.

In block 310, the platform trusted execution environment 212 receives a FPGA hash corresponding to a FPGA image 224 to be configured. As described above, the FPGA hash may be embodied as a hash of the FPGA image 224 or other data that may be used to verify the authenticity of the FPGA image 224. The FPGA image 224 may be supplied and signed by, for example, the original equipment manufacturer (OEM) of the computing device 102, an independent software vendor (ISV), or other supply chain entity. In block 312, the platform trusted execution environment 212 may receive the FPGA hash from the user via the trusted I/O session. For example, the user may enter a hash value received via an out-of-band communication such as an email or text message. In some embodiments, the user may enter a passcode, pass phrase, or other secret that may be used to access the FPGA hash (e.g., to provide two-factor authentication). Additionally, the trusted I/O session may perform additional user interface tasks, such as obtaining user consent to update the FPGA 132, performing a user authentication challenge, or performing other administrative tasks.

In some embodiments, in block 314, the trusted execution environment 204 may receive the FPGA hash from the remote management server 104. For example, the remote management server 104 may push the FPGA hash to the trusted execution environment 204 via an out-of-band network interface of the CSME 134. The remote management server 104 may be controlled, for example, by the OEM of the computing device 102, by an enterprise that deploys the computing device 102, or by another administrator of the computing device 102. In some embodiments, part or all of the FPGA hash may be received from both the user via the trusted I/O session and the remote management server 104 via the network 106.

In block 316, the platform trusted execution environment 212 provisions the FPGA hash to the FPGA manifest 222 in the secure storage 220 after any necessary verification. The secure storage 220 may be embodied as any secure storage accessible to the trusted execution environment 204 and the platform trusted execution environment 212. For example, the FPGA manifest 222 may be included in a secure partition or other secure part of the data storage device 128, in non-volatile platform flash memory, in non-volatile memory of the FPGA 132, or in other non-volatile storage of the computing device 102. In some embodiments, the FPGA manifest 222 may be capable of storing multiple FPGA hashes. For example, the FPGA manifest 222 may store a predetermined number of the most-recently used FPGA hashes. In some embodiments, in block 318, the computing device 102 may provision a signed FPGA image 224 associated with the FPGA hash to the secure storage 220. For example, the computing device 102 may download the FPGA image 224 from the remote management server 104 or another remote device (e.g., an application store or other application repository) and then provision the FPGA image 224 to the secure storage 220.

In block 320, in some embodiments the platform trusted execution environment 212 may store a launch configuration policy associated with the FPGA hash in the FPGA manifest 222. As described further below, the platform trusted execution environment 212 may evaluate the launch configuration policy at boot time to determine whether to allow a particular FPGA hash to be used. Thus, the launch configuration policy may define one or more rules that may be evaluated by the computing device 102 to determine whether to allow the associated FPGA hash. For example, the launch configuration policy may specify an allowed geographical region (a geofence), an allowed device context (e.g., particular times of day, work or personal, or other contextual data), or other criteria that may be evaluated to determine whether to allow the associated FPGA hash.

In block 322, the FPGA manager 206 of the trusted execution environment 204 may seal the FPGA hash to a trusted boot code of the trusted execution environment 204. The FPGA manager 206 may, for example, encrypt the FPGA hash such that only a particular trusted boot code may decrypt the encrypted FPGA hash. The trusted boot code may be embodied as, for example, trusted firmware of the CSME 134 and/or the FPGA 132, UEFI early boot code, or other early boot code such as legacy BIOS or coreboot. Although illustrated as sealing the FPGA hash, it should be understood that in some embodiments the computing device 102 may store the FPGA hash in any manner so that the FPGA hash is accessible to the FPGA manager 206 during boot.

In block 324, the FPGA manager 206 sets an FPGA launch bit. The FPGA launch bit may be embodied as any non-volatile data accessible by the FPGA manager 206, such as a firmware variable, a CSME 134 register, data stored in platform non-volatile memory, data stored in a non-volatile memory of the FPGA 132, or other data. As described further below in connection with FIG. 4, when the FPGA launch bit is set, upon reset the computing device 102 may configure the FPGA image 224 to be used and determine whether to allow the use of the FPGA image 224 based on the FPGA hash.

In block 326, the computing device 102 performs a platform reset. For example, the computing device 102 may reboot, power cycle, or otherwise reset the processor 120. The platform reset may be triggered by software such as the FPGA manager 206 or an operating system of the computing device 102. Although illustrated as performing a platform reset, it should be understood that in some embodiments, the computing device 102 may not perform an immediate reset and instead the FPGA image 224 configuration may become effective upon the next reboot. In those embodiments, the platform reset may be caused by a user manually rebooting or otherwise power-cycling the computing device 102 and/or the computing device 102 may initiate the platform reset with an alert or other notification to the user via trusted I/O. After resetting, the computing device 102 boots and may execute a method for configuring the FPGA 132 as described below in connection with FIG. 4.

Figure 4:
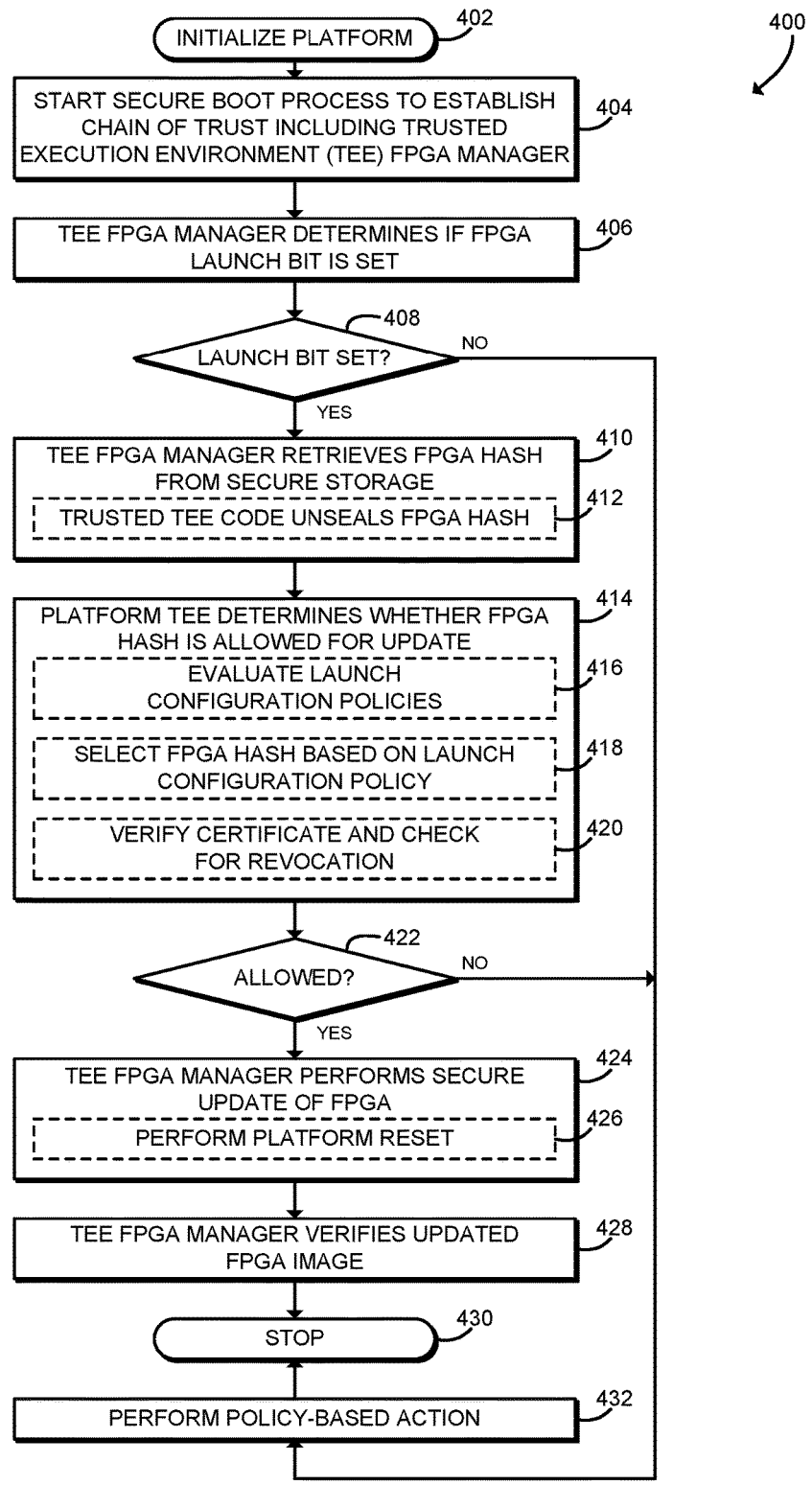
FIG. 4 is a simplified flow diagram of at least one embodiment of a method for boot configuration of an FPGA image that may be executed by the computing device of FIGS. 1-2.

Referring now to FIG. 4, in use, the computing device 102 may execute a method 400 for FPGA image configuration at boot time. It should be appreciated that, in some embodiments, the operations of the method 400 may be performed by one or more modules of the environment 200 of the computing device 102 as shown in FIG. 2. The method 400 begins in block 402, in which the computing device 102 performs platform initialization. The computing device 102 may initialize the platform by executing early boot code, such as a pre-boot firmware environment of platform firmware, trusted UEFI early boot code, or other early boot code such as legacy BIOS or coreboot. For example, the early boot code may initialize platform hardware components such as the processor 120, the memory 126, and/or other components of the computing device 102.

In block 404, the computing device 102 starts a secure boot process to establish a chain of trust. The secure boot process may be embodied as any technique to securely verify software and/or firmware components loaded by the computing device 102, such as Intel® Trusted Execution Technology (TXT) or any other secure boot technology. The computing device 102 may, for example, verify a signature of each firmware module, firmware driver, boot loader, operating system loader, or other software component as that component is loaded. The computing device 102 may generate an error or otherwise prevent non-verified software components from being loaded. As part of the secure boot process, the computing device 102 verifies the trusted execution environment 204 and/or the FPGA manager 206. Thus, by being verified, the FPGA manager 206 is included in the chain of trust established by the secure boot process. Additionally, any FPGA images 224 verified by the FPGA manager 206 are thus also included in the chain of trust, as described further below.

In block 406, the FPGA manager 206 determines whether the FPGA launch bit is set. As described above in connection with block 324 of FIG. 3, the FPGA launch bit may be set in response to the FPGA manager 206 and/or the platform trusted execution environment 212 configuring an FPGA hash at runtime. The FPGA launch bit may be embodied as any non-volatile data accessible by the FPGA manager 206, such as a firmware variable, a CSME 134 register, data stored in platform non-volatile memory, data stored in non-volatile memory of the FPGA 132, or other data. In block 408, the computing device 102 checks whether the FPGA launch bit is set. If not, the method 400 branches ahead to block 432, described below. If the FPGA launch bit is set, the method 400 advances to block 410.

In block 410, the FPGA manager 206 retrieves the FPGA hash from the secure storage 220. For example, the FPGA manager 206 may load the FPGA hash from the FPGA manifest 222. As described above, in some embodiments the CSME 134 may load the FPGA hash from secure storage 220 such as platform flash memory. Additionally or alternatively, in some embodiments the FPGA 132 may load the FPGA hash from non-volatile storage of the FPGA 132 or from other platform non-volatile memory. If no FPGA hash is available in the FPGA manifest 222, the FPGA manager 206 may generate an error, prevent configuration of the FPGA 132, and/or perform another policy-based action. In some embodiments, in block 412 a trusted boot code of the trusted execution environment 204 may unseal the FPGA hash. As described above in connection with block 322 of FIG. 3, the FPGA hash may have been sealed by the computing device 102 at runtime. To unseal the FPGA hash, the trusted boot code may, for example, decrypt a FPGA hash that has been encrypted such that only the trusted boot code may decrypt it.

In block 414, the platform trusted execution environment 212 determines whether the FPGA hash is allowed for launch. The platform trusted execution environment 212 may determine whether the FPGA hash has been expressly allowed (i.e., whitelisted) for use. The platform trusted execution environment 212 may receive the FPGA hash from the FPGA manager 206, for example via the HECI bus. The platform trusted execution environment 212 may receive the FPGA hash itself, an index of the FPGA hash in the FPGA manifest 222, or other indicator of the FPGA hash. The platform trusted execution environment 212 may report whether the FPGA hash is allowed to the FPGA manager 206, for example via the HECI bus.

In some embodiments, in block 416 the platform trusted execution environment 212 may evaluate one or more launch configuration policies associated with the FPGA hash to determine whether to allow the FPGA hash. As described above, each launch configuration policy may define one or more rules that may be evaluated by the computing device 102 to determine whether to allow the associated FPGA hash. For example, the launch configuration policy may specify an allowed geographical region (geofence), an allowed device context (e.g., particular times of day, work or personal, or other contextual data), or other criteria that may be evaluated to determine whether to allow the associated FPGA hash. Thus, the platform trusted execution environment 212 may allow and/or deny use of a particular FPGA hash based on the location, context, or other current attributes of the computing device 102. In some embodiments, in block 418 the platform trusted execution environment 212 may evaluate launch configuration policies associated with multiple FPGA hashes and select an FPGA hash based on the policy. For example, the trusted execution environment 204 may select a FPGA hash from the FPGA manifest 222 based on the associated launch configuration policies (e.g., based on which FPGA hash is allowed).

In some embodiments, in block 420 the platform trusted execution environment 212 may retrieve and verify a certificate associated with the FPGA hash. As described above, the FPGA hash may be embodied as a hash of a corresponding signed FPGA image 224. The platform trusted execution environment 212 may verify, for example, that the FPGA image 224 was signed using a certificate of a known entity, such as the OEM of the computing device 102 or a known ISV. Additionally or alternatively, the platform trusted execution environment 212 may verify that the certificate associated with the FPGA hash has not been revoked. For example, the platform trusted execution environment 212 may check for revocation via the online certificate status protocol (OCSP) or by checking certificate revocation lists from a certificate authority. The platform trusted execution environment 212 may perform revocation checks using, for example, an out-of-band network interface of the CSME 134.

In block 422, the computing device 102 checks whether the FPGA hash was allowed. If not, the method 400 branches ahead to block 432, as described below. If the FPGA hash is allowed, the method 400 advances to block 424, in which the FPGA manager 206 performs a secure update of the FPGA 132. In particular, the FPGA manager 206 may program the FPGA image 224 to the FPGA 132 or otherwise configure the FPGA 132 with the FPGA image 224. After being programmed with the FPGA image 224, the FPGA 132 is capable of performing the hardware functions defined by the FPGA image 224. In some embodiments, in block 426, the computing device 102 may perform a platform reset to complete the update of the FPGA 132.

After updating the FPGA 132, the method 400 advances to block 428, in which the FPGA manager 206 verifies the updated image of the FPGA 132. The FPGA 132 may generate a measurement of the FPGA image 224 that was programmed to the FPGA 132 in block 424. For example, FPGA 132 may generate a hash, a signature, or other cryptographic measurement of the FPGA image 224. The FPGA manager 206 may verify the FPGA 132 by comparing this measurement to the FPGA hash that was allowed as described above in connection with block 414. In some embodiments, the computing device 102 may provide an acknowledgement of the verification to an external verifier, such as the remote management server 104. If not verified, the computing device 102 may generate an error or otherwise perform one or more policy-based actions such as those described further below in connection with block 432. If verified, the method 400 advances to block 430, in which the method 400 for FPGA configuration is completed. After FPGA configuration is complete, the computing device 102 may continue with the secure boot process and allow use of the FPGA 132 at runtime. Because the FPGA image 224 of the FPGA 132 was verified by an entity in the chain of trust, the functions of the FPGA 132 are also included in the chain of trust.

Referring back to block 408, if the FPGA launch bit is not set, the method 400 branches to block 432. Additionally, referring back to block 422, if the FPGA hash is not allowed, the method 400 also branches to block 432. In block 432, the computing device 102 may perform one or more policy-based actions, such as logging an error, notifying an administrator, shutting down the computing device 102, or performing any other appropriate security response. In some embodiments, the computing device 102 may configure the FPGA 132 with one or more default FPGA images 224 or other trusted FPGA images 224. After performing the policy response, the method 400 may advance to block 430, in which the method 400 for FPGA configuration is completed.

It should be appreciated that, in some embodiments, the methods 300 and/or 400 may be embodied as various instructions stored on a computer-readable media, which may be executed by the processor 120, the I/O subsystem 124, the FPGA 132, the CSME 134, and/or other components of the computing device 102 to cause the computing device 102 to perform the respective method 300 and/or 400. The computer-readable media may be embodied as any type of media capable of being read by the computing device 102 including, but not limited to, the memory 126, the data storage device 128, firmware devices, and/or other media.

Examples

Illustrative examples of the technologies disclosed herein are provided below. An embodiment of the technologies may include any one or more, and any combination of, the examples described below.

Example 1 includes a computing device for configuring a field-programmable gate array (FPGA), the computing device comprising: a field programmable gate array (FPGA); a secure boot loader to start a secure boot process to establish a chain of trust, wherein the chain of trust includes a trusted execution environment of the computing device; an FPGA updater to load, by the trusted execution environment, an FPGA hash from an FPGA manifest stored in a secure storage of the computing device in response to a start of the secure boot process; and an FPGA hash checker to determine, by a platform trusted execution environment of the computing device, whether the FPGA hash is allowed for launch in response to a load of the FPGA hash; wherein the FPGA updater is further to (i) configure, by the trusted execution environment, the FPGA with an FPGA image that corresponds to the FPGA hash in response to a determination that the FPGA hash is allowed for launch, and (ii) verify, by the trusted execution environment, the FPGA image of the FPGA with the FPGA hash in response to configuration of the FPGA.

Example 2 includes the subject matter of Example 1, and wherein the FPGA hash comprises a hash of the FPGA image, wherein the FPGA image comprises a module definition for the FPGA.

Example 3 includes the subject matter of any of Examples 1 and 2, and wherein to verify the FPGA image comprises to verify a signature of the FPGA with the FPGA hash.

Example 4 includes the subject matter of any of Examples 1-3, and wherein to determine whether the FPGA hash is allowed for launch comprises to validate a certificate associated with the FPGA hash.

Example 5 includes the subject matter of any of Examples 1-4, and wherein to validate the certificate comprises to perform a certificate revocation check.

Example 6 includes the subject matter of any of Examples 1-5, and wherein to determine whether the FPGA hash is allowed for launch comprises to evaluate a launch policy from the FPGA manifest, wherein the launch policy is associated with the FPGA hash.

Example 7 includes the subject matter of any of Examples 1-6, and wherein to evaluate the launch policy comprises to determine a location of the computing device.

Example 8 includes the subject matter of any of Examples 1-7, and wherein the FPGA hash checker is further to select, by the platform trusted execution environment, the FPGA hash from the FPGA hash manifest based on the associated launch policy, wherein the FPGA hash manifest stores a plurality of FPGA hashes.

Example 9 includes the subject matter of any of Examples 1-8, and wherein the FPGA hash checker is further to perform, by the platform trusted execution environment, a policy-based action in response to a determination that the FPGA hash is not allowed for launch.

Example 10 includes the subject matter of any of Examples 1-9, and further comprising an FPGA configuration manager to: store, by the trusted execution environment, the FPGA hash in the FPGA hash manifest in the secure storage of the computing device; set, by the trusted execution environment, an FPGA launch bit in response to storage of the FPGA hash in the FPGA hash manifest; and reset the computing device in response to a setting of the FPGA launch bit, wherein to start the secure boot process comprises to start the secure boot process in response to a reset of the computing device; wherein the FPGA updater is further to determine, by the trusted execution environment, whether the FPGA launch bit is set in response to the start of the secure boot process, wherein to load the FPGA hash comprises to load the FPGA hash in response to a determination that the FPGA launch bit is set.

Example 11 includes the subject matter of any of Examples 1-10, and wherein: the FPGA configuration manager is further to seal, by the trusted execution environment, the FPGA hash to generate an encrypted hash bound to a trusted execution environment boot code of the computing device in response to the storage of the FPGA hash in the FPGA hash manifest; and the FPGA updater is further to unseal, by the trusted execution environment boot code, the encrypted hash to recover the FPGA hash in response to the determination that the FPGA launch bit is set, wherein to load the FPGA hash further comprises to load the FPGA hash in response to an unsealing of the encrypted hash.

Example 12 includes the subject matter of any of Examples 1-11, and wherein the FPGA configuration manager is further to update, by the trusted execution environment, the FPGA hash manifest with a launch policy associated with the FPGA hash in response to the storage of the FPGA hash in the FPGA hash manifest.

Example 13 includes the subject matter of any of Examples 1-12, and further comprising a trusted I/O interface to: open, by the platform trusted execution environment, a trusted I/O session; and receive, by the platform trusted execution environment, the FPGA hash via the trusted I/O session; wherein to store the FPGA hash comprises to store the FPGA hash in response to receipt of the FPGA hash.

Example 14 includes the subject matter of any of Examples 1-13, and wherein: the FPGA configuration manager is further to request, by the trusted execution environment, the platform trusted execution environment to start the trusted I/O session; and to open the trusted I/O session comprises to open the trusted I/O session in response to a request to the platform trusted execution environment to start the trusted I/O session.

Example 15 includes the subject matter of any of Examples 1-14, and further comprising a remote management interface to: receive, by the platform trusted execution environment, the FPGA hash from a remote management server via an out-of-band network connection; wherein to store the FPGA hash comprises to store the FPGA hash in response to receipt of the FPGA hash.

Example 16 includes the subject matter of any of Examples 1-15, and wherein: the FPGA configuration manager is further to provision, by the trusted execution environment, the FPGA image to the secure storage of the computing device; and to configure the FPGA of the computing device with the FPGA image comprises to load the FPGA image from the secure storage of the computing device.

Example 17 includes the subject matter of any of Examples 1-16, and wherein: the FPGA configuration manager is further to receive, by the trusted execution environment, the FPGA image from a remote computing device; wherein to provision the FPGA image to the secure storage comprises to provision the FPGA image to the secure storage in response to receipt of the FPGA image.

Example 18 includes the subject matter of any of Examples 1-17, and further comprising a converged security and manageability engine to establish the platform trusted execution environment.

Example 19 includes the subject matter of any of Examples 1-18, and wherein the FPGA is further to establish the trusted execution environment.

Example 20 includes the subject matter of any of Examples 1-19, and wherein the FPGA comprises a secure non-volatile memory to establish the secure storage.

Example 21 includes a method for configuring a field-programmable gate array (FPGA), the method comprising: starting, by the computing device, a secure boot process to establish a chain of trust, wherein the chain of trust includes a trusted execution environment of the computing device; loading, by the trusted execution environment, an FPGA hash from an FPGA manifest stored in a secure storage of the computing device in response to starting the secure boot process; determining, by a platform trusted execution environment of the computing device, whether the FPGA hash is allowed for launch in response to loading the FPGA hash; configuring, by the trusted execution environment, an FPGA of the computing device with an FPGA image that corresponds to the FPGA hash in response to determining that the FPGA hash is allowed for launch; and verifying, by the trusted execution environment, the FPGA image of the FPGA using the FPGA hash in response to configuring the FPGA.

Example 22 includes the subject matter of Example 21, and wherein the FPGA hash comprises a hash of the FPGA image, wherein the FPGA image comprises a module definition for the FPGA.

Example 23 includes the subject matter of any of Examples 21 and 22, and wherein verifying the FPGA image comprises verifying a signature of the FPGA using the FPGA hash.

Example 24 includes the subject matter of any of Examples 21-23, and wherein determining whether the FPGA hash is allowed for launch comprises validating a certificate associated with the FPGA hash.

Example 25 includes the subject matter of any of Examples 21-24, and wherein validating the certificate comprises performing a certificate revocation check.

Example 26 includes the subject matter of any of Examples 21-25, and wherein determining whether the FPGA hash is allowed for launch comprises evaluating a launch policy from the FPGA manifest, wherein the launch policy is associated with the FPGA hash.

Example 27 includes the subject matter of any of Examples 21-26, and wherein evaluating the launch policy comprises determining a location of the computing device.

Example 28 includes the subject matter of any of Examples 21-27, and further comprising selecting, by the platform trusted execution environment, the FPGA hash from the FPGA hash manifest based on the associated launch policy, wherein the FPGA hash manifest stores a plurality of FPGA hashes.

Example 29 includes the subject matter of any of Examples 21-28, and further comprising performing, by the platform trusted execution environment, a policy-based action in response to determining that the FPGA hash is not allowed for launch.

Example 30 includes the subject matter of any of Examples 21-29, and further comprising: storing, by the trusted execution environment, the FPGA hash in the FPGA hash manifest in the secure storage of the computing device; setting, by the trusted execution environment, an FPGA launch bit in response to storing the FPGA hash in the FPGA hash manifest; resetting the computing device in response to setting the FPGA launch bit, wherein starting the secure boot process comprises starting the secure boot process in response to resetting the computing device; and determining, by the trusted execution environment, whether the FPGA launch bit is set in response to starting the secure boot process, wherein loading the FPGA hash comprises loading the FPGA hash in response to determining that the FPGA launch bit is set.

Example 31 includes the subject matter of any of Examples 21-30, and further comprising: sealing, by the trusted execution environment, the FPGA hash to generate an encrypted hash bound to a trusted execution environment boot code of the computing device in response to storing the FPGA hash in the FPGA hash manifest; and unsealing, by the trusted execution environment boot code, the encrypted hash to recover the FPGA hash in response to determining that the FPGA launch bit is set, wherein loading the FPGA hash further comprises loading the FPGA hash in response to unsealing the encrypted hash.

Example 32 includes the subject matter of any of Examples 21-31, and further comprising updating, by the trusted execution environment, the FPGA hash manifest with a launch policy associated with the FPGA hash in response to storing the FPGA hash in the FPGA hash manifest.

Example 33 includes the subject matter of any of Examples 21-32, and further comprising: opening, by the platform trusted execution environment, a trusted I/O session; and receiving, by the platform trusted execution environment, the FPGA hash via the trusted I/O session; wherein storing the FPGA hash comprises storing the FPGA hash in response to receiving the FPGA hash.

Example 34 includes the subject matter of any of Examples 21-33, and further comprising: requesting, by the trusted execution environment, the platform trusted execution environment to start the trusted I/O session; wherein opening the trusted I/O session comprises opening the trusted I/O session in response to requesting the platform trusted execution environment to start the trusted I/O session.

Example 35 includes the subject matter of any of Examples 21-34, and further comprising: receiving, by the platform trusted execution environment, the FPGA hash from a remote management server via an out-of-band network connection; wherein storing the FPGA hash comprises storing the FPGA hash in response to receiving the FPGA hash.

Example 36 includes the subject matter of any of Examples 21-35, and further comprising: provisioning, by the trusted execution environment, the FPGA image to the secure storage of the computing device; wherein configuring the FPGA of the computing device with the FPGA image comprises loading the FPGA image from the secure storage of the computing device.

Example 37 includes the subject matter of any of Examples 21-36, and further comprising: receiving, by the trusted execution environment, the FPGA image from a remote computing device; wherein provisioning the FPGA image to the secure storage comprises provisioning the FPGA image to the secure storage in response to receiving the FPGA image.

Example 38 includes the subject matter of any of Examples 21-37, and further comprising establishing, by a converged security and manageability engine of the computing device, the platform trusted execution environment.

Example 39 includes the subject matter of any of Examples 21-38, and further comprising establishing, by the FPGA, the trusted execution environment.

Example 40 includes the subject matter of any of Examples 21-39, and wherein the secure storage comprises a secure non-volatile memory of the FPGA.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for configuring a field-programmable gate array (FPGA), the computing device comprising: means for starting a secure boot process to establish a chain of trust, wherein the chain of trust includes a trusted execution environment of the computing device; means for loading, by the trusted execution environment, an FPGA hash from an FPGA manifest stored in a secure storage of the computing device in response to starting the secure boot process; means for determining, by a platform trusted execution environment of the computing device, whether the FPGA hash is allowed for launch in response to loading the FPGA hash; means for configuring, by the trusted execution environment, an FPGA of the computing device with an FPGA image that corresponds to the FPGA hash in response to determining that the FPGA hash is allowed for launch; and means for verifying, by the trusted execution environment, the FPGA image of the FPGA using the FPGA hash in response to configuring the FPGA.

Example 45 includes the subject matter of Example 44, and wherein the FPGA hash comprises a hash of the FPGA image, wherein the FPGA image comprises a module definition for the FPGA.

Example 46 includes the subject matter of any of Examples 44 and 45, and wherein the means for verifying the FPGA image comprises means for verifying a signature of the FPGA using the FPGA hash.

Example 47 includes the subject matter of any of Examples 44-46, and wherein the means for determining whether the FPGA hash is allowed for launch comprises means for validating a certificate associated with the FPGA hash.

Example 48 includes the subject matter of any of Examples 44-47, and wherein the means for validating the certificate comprises means for performing a certificate revocation check.

Example 49 includes the subject matter of any of Examples 44-48, and wherein the means for determining whether the FPGA hash is allowed for launch comprises means for evaluating a launch policy from the FPGA manifest, wherein the launch policy is associated with the FPGA hash.

Example 50 includes the subject matter of any of Examples 44-49, and wherein the means for evaluating the launch policy comprises means for determining a location of the computing device.

Example 51 includes the subject matter of any of Examples 44-50, and further comprising means for selecting, by the platform trusted execution environment, the FPGA hash from the FPGA hash manifest based on the associated launch policy, wherein the FPGA hash manifest stores a plurality of FPGA hashes.

Example 52 includes the subject matter of any of Examples 44-51, and further comprising means for performing, by the platform trusted execution environment, a policy-based action in response to determining that the FPGA hash is not allowed for launch.

Example 53 includes the subject matter of any of Examples 44-52, and further comprising: means for storing, by the trusted execution environment, the FPGA hash in the FPGA hash manifest in the secure storage of the computing device; means for setting, by the trusted execution environment, an FPGA launch bit in response to storing the FPGA hash in the FPGA hash manifest; means for resetting the computing device in response to setting the FPGA launch bit, wherein starting the secure boot process comprises starting the secure boot process in response to resetting the computing device; and means for determining, by the trusted execution environment, whether the FPGA launch bit is set in response to starting the secure boot process, wherein loading the FPGA hash comprises loading the FPGA hash in response to determining that the FPGA launch bit is set.

Example 54 includes the subject matter of any of Examples 44-53, and further comprising: means for sealing, by the trusted execution environment, the FPGA hash to generate an encrypted hash bound to a trusted execution environment boot code of the computing device in response to storing the FPGA hash in the FPGA hash manifest; and means for unsealing, by the trusted execution environment boot code, the encrypted hash to recover the FPGA hash in response to determining that the FPGA launch bit is set, wherein loading the FPGA hash further comprises loading the FPGA hash in response to unsealing the encrypted hash.

Example 55 includes the subject matter of any of Examples 44-54, and further comprising means for updating, by the trusted execution environment, the FPGA hash manifest with a launch policy associated with the FPGA hash in response to storing the FPGA hash in the FPGA hash manifest.

Example 56 includes the subject matter of any of Examples 44-55, and further comprising: means for opening, by the platform trusted execution environment, a trusted I/O session; and means for receiving, by the platform trusted execution environment, the FPGA hash via the trusted I/O session; wherein the means for storing the FPGA hash comprises means for storing the FPGA hash in response to receiving the FPGA hash.

Example 57 includes the subject matter of any of Examples 44-56, and further comprising: means for requesting, by the trusted execution environment, the platform trusted execution environment to start the trusted I/O session; wherein the means for opening the trusted I/O session comprises means for opening the trusted I/O session in response to requesting the platform trusted execution environment to start the trusted I/O session.

Example 58 includes the subject matter of any of Examples 44-57, and further comprising: means for receiving, by the platform trusted execution environment, the FPGA hash from a remote management server via an out-of-band network connection; wherein the means for storing the FPGA hash comprises means for storing the FPGA hash in response to receiving the FPGA hash.

Example 59 includes the subject matter of any of Examples 44-58, and further comprising: means for provisioning, by the trusted execution environment, the FPGA image to the secure storage of the computing device; wherein the means for configuring the FPGA of the computing device with the FPGA image comprises means for loading the FPGA image from the secure storage of the computing device.

Example 60 includes the subject matter of any of Examples 44-59, and further comprising: means for receiving, by the trusted execution environment, the FPGA image from a remote computing device; wherein the means for provisioning the FPGA image to the secure storage comprises means for provisioning the FPGA image to the secure storage in response to receiving the FPGA image.

Example 61 includes the subject matter of any of Examples 44-60, and further comprising means for establishing, by a converged security and manageability engine of the computing device, the platform trusted execution environment.

Example 62 includes the subject matter of any of Examples 44-61, and further comprising means for establishing, by the FPGA, the trusted execution environment.

Example 63 includes the subject matter of any of Examples 44-62, and wherein the secure storage comprises a secure non-volatile memory of the FPGA.

The invention claimed is:

1. A computing device for configuring a field-programmable gate array (FPGA), the computing device comprising:
   a field programmable gate array (FPGA);
   a secure boot loader to start a secure boot process to establish a chain of trust, wherein the chain of trust includes a trusted execution environment of the computing device;
   an FPGA updater to load, by the trusted execution environment, an FPGA hash from an FPGA manifest stored in a secure storage of the computing device in response to a start of the secure boot process, wherein the FPGA hash comprises a hash of an FPGA image;
   an FPGA hash checker to determine, by a platform trusted execution environment of the computing device, whether the FPGA image is allowed for launch as a function of (i) the FPGA hash in response to a load of the FPGA hash and (ii) a launch policy associated with the FPGA hash from the FPGA manifest;
   an FPGA configuration manager to: store, by the trusted execution environment, the FPGA hash in the FPGA hash manifest in the secure storage of the computing device, set, by the trusted execution environment, an FPGA launch bit in response to storage of the FPGA hash in the FPGA hash manifest; and reset the computing device in response to a setting of the FPGA launch bit, wherein to start the secure boot process comprises to start the secure boot process in response to a reset of the computing device, wherein the FPGA configuration manager is further to seal, by the trusted execution environment, the FPGA hash to generate an encrypted hash bound to a trusted execution environment boot code of the computing device in response to the storage of the FPGA hash in the FPGA hash manifest;
   wherein the FPGA updater is further to unseal, by the trusted execution environment boot code, the encrypted hash to recover the FPGA hash in response to the determination that the FPGA launch bit is set, wherein to load the FPGA hash further comprises to load the FPGA hash in response to an unsealing of the encrypted hash;
   wherein the FPGA updater is further to determine, by the trusted execution environment, whether the FPGA launch bit is set in response to the start of the secure boot process, wherein to load the FPGA hash comprises to load the FPGA hash in response to a determination that the FPGA launch bit is set;
   wherein the FPGA updater is further to (i) configure, by the trusted execution environment, the FPGA with the FPGA image in response to a determination that the FPGA image is allowed for launch, and (ii) verify, by the trusted execution environment, the FPGA image of the FPGA with the FPGA hash in response to configuration of the FPGA.

2. The computing device of claim 1, wherein to determine whether the FPGA image is allowed for launch comprises to validate a certificate associated with the FPGA hash.

3. The computing device of claim 2, wherein to validate the certificate comprises to perform a certificate revocation check.

4. The computing device of claim 1, wherein the FPGA hash checker is further to select, by the platform trusted execution environment, the FPGA hash from the FPGA hash manifest based on the associated launch policy, wherein the FPGA hash manifest stores a plurality of FPGA hashes.

5. The computing device of claim 1, further comprising a trusted I/O interface to:
   open, by the platform trusted execution environment, a trusted I/O session; and
   receive, by the platform trusted execution environment, the FPGA hash via the trusted I/O session;
   wherein to store the FPGA hash comprises to store the FPGA hash in response to receipt of the FPGA hash.

6. The computing device of claim 1, further comprising a remote management interface to:
   receive, by the platform trusted execution environment, the FPGA hash from a remote management server via an out-of-band network connection;
   wherein to store the FPGA hash comprises to store the FPGA hash in response to receipt of the FPGA hash.

7. The computing device of claim 1, wherein:
   the FPGA configuration manager is further to provision, by the trusted execution environment, the FPGA image to the secure storage of the computing device; and
   to configure the FPGA of the computing device with the FPGA image comprises to load the FPGA image from the secure storage of the computing device.

8. The computing device of claim 1, further comprising a converged security and manageability engine to establish the platform trusted execution environment, wherein the converged security and manageability engine comprises an embedded controller of the computing device independent of the FPGA.

9. The computing device of claim 8, wherein the FPGA is further to establish the trusted execution environment.

10. The computing device of claim 9, wherein the FPGA comprises a secure non-volatile memory to establish the secure storage.

11. The computing device of claim 1, wherein the launch policy is based on a geographic location of the computing device.

12. The computing device of claim 1, wherein the launch policy is based on a device context.

13. A method for configuring a field-programmable gate array (FPGA), the method comprising:
   starting, by the computing device, a secure boot process to establish a chain of trust, wherein the chain of trust includes a trusted execution environment of the computing device;
   loading, by the trusted execution environment, an FPGA hash from an FPGA manifest stored in a secure storage of the computing device in response to starting the secure boot process, wherein the FPGA hash comprises a hash of an FPGA image;
   determining, by a platform trusted execution environment of the computing device, whether the FPGA image is allowed for launch as a function of (i) the FPGA hash in response to loading the FPGA hash and (ii) a launch policy associated with the FPGA hash from the FPGA manifest;
   configuring, by the trusted execution environment, an FPGA of the computing device with the FPGA image in response to determining that the FPGA image is allowed for launch;
   verifying, by the trusted execution environment, the FPGA image of the FPGA using the FPGA hash in response to configuring the FPGA;
   storing, by the trusted execution environment, the FPGA hash in the FPGA hash manifest in the secure storage of the computing device;
   setting, by the trusted execution environment, an FPGA launch bit in response to storing the FPGA hash in the FPGA hash manifest;
   resetting the computing device in response to setting the FPGA launch bit, wherein starting the secure boot process comprises starting the secure boot process in response to resetting the computing device;
   sealing, by the trusted execution environment, the FPGA hash to generate an encrypted hash bound to a trusted execution environment boot code of the computing device in response to the storage of the FPGA hash in the FPGA hash manifest;
   unsealing, by the trusted execution environment boot code, the encrypted hash to recover the FPGA hash in response to the determination that the FPGA launch bit is set, wherein loading the FPGA hash further comprises loading the FPGA hash in response to an unsealing of the encrypted hash; and
   determining, by the trusted execution environment, whether the FPGA launch bit is set in response to starting the secure boot process, wherein loading the FPGA hash comprises loading the FPGA hash in response to determining that the FPGA launch bit is set.

14. The method of claim 13, further comprising selecting, by the platform trusted execution environment, the FPGA hash from the FPGA hash manifest based on the associated launch policy, wherein the FPGA hash manifest stores a plurality of FPGA hashes.

15. The method of claim 13, further comprising:
   opening, by the platform trusted execution environment, a trusted I/O session; and
   receiving, by the platform trusted execution environment, the FPGA hash via the trusted I/O session;
   wherein storing the FPGA hash comprises storing the FPGA hash in response to receiving the FPGA hash.

16. The method of claim 13, further comprising:
   receiving, by the platform trusted execution environment, the FPGA hash from a remote management server via an out-of-band network connection;
   wherein storing the FPGA hash comprises storing the FPGA hash in response to receiving the FPGA hash.

17. One or more non-transitory, computer-readable storage media comprising a plurality of instructions that in response to being executed cause a computing device to:
   start a secure boot process to establish a chain of trust, wherein the chain of trust includes a trusted execution environment of the computing device;
   load, by the trusted execution environment, an FPGA hash from an FPGA manifest stored in a secure storage of the computing device in response to starting the secure boot process, wherein the FPGA hash comprises a hash of an FPGA image;
   determine, by a platform trusted execution environment of the computing device, whether the FPGA image is allowed for launch as a function of (i) the FPGA hash in response to loading the FPGA hash and (ii) a launch policy associated with the FPGA hash from the FPGA manifest;
   configure, by the trusted execution environment, an FPGA of the computing device with the FPGA image in response to determining that the FPGA image is allowed for launch; and
   verify, by the trusted execution environment, the FPGA image of the FPGA using the FPGA hash in response to configuring the FPGA
   store, by the trusted execution environment, the FPGA hash in the FPGA hash manifest in the secure storage of the computing device;
   set, by the trusted execution environment, an FPGA launch bit in response to storing the FPGA hash in the FPGA hash manifest;
   reset the computing device in response to setting the FPGA launch bit, wherein starting the secure boot process comprises starting the secure boot process in response to resetting the computing device;
   seal, by the trusted execution environment, the FPGA hash to generate an encrypted hash bound to a trusted execution environment boot code of the computing device in response to the storage of the FPGA hash in the FPGA hash manifest;
   unseal, by the trusted execution environment boot code, the encrypted hash to recover the FPGA hash in response to the determination that the FPGA launch bit is set, wherein to load the FPGA hash further comprises to load the FPGA hash in response to an unsealing of the encrypted hash; and
   determine, by the trusted execution environment, whether the FPGA launch bit is set in response to starting the secure boot process, wherein to load the FPGA hash comprises to load the FPGA hash in response to determining that the FPGA launch bit is set.

18. The one or more non-transitory, computer-readable storage media of claim 17, further comprising a plurality of instructions that in response to being executed cause the computing device to select, by the platform trusted execution environment, the FPGA hash from the FPGA hash manifest based on the associated launch policy, wherein the FPGA hash manifest stores a plurality of FPGA hashes.

19. The one or more non-transitory, a computer-readable storage media of claim 17, further comprising a plurality of instructions that in response to being executed cause the computing device to:
- open, by the platform trusted execution environment, a trusted I/O session; and
- receive, by the platform trusted execution environment, the FPGA hash via the trusted I/O session;
- wherein to store the FPGA hash comprises to store the FPGA hash in response to receiving the FPGA hash.

20. The one or more non-transitory, computer-readable storage media of claim 17, further comprising a plurality of instructions that in response to being executed cause the computing device to:
- receive, by the platform trusted execution environment, the FPGA hash from a remote management server via an out-of-band network connection;
- wherein to store the FPGA hash comprises to store the FPGA hash in response to receiving the FPGA hash.

* * * * *